April 27, 1954
C. A. HEILAND
2,677,105
BIFILAR SUSPENSION
Filed May 15, 1950
2 Sheets-Sheet 1
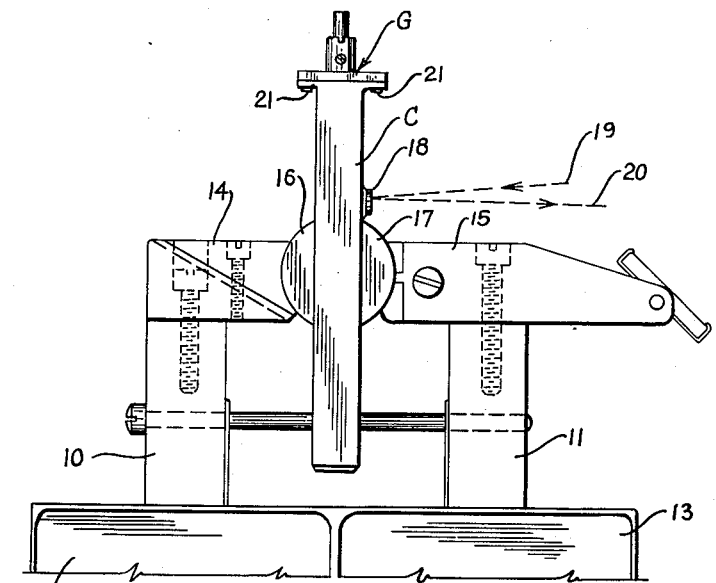
FIG.—1
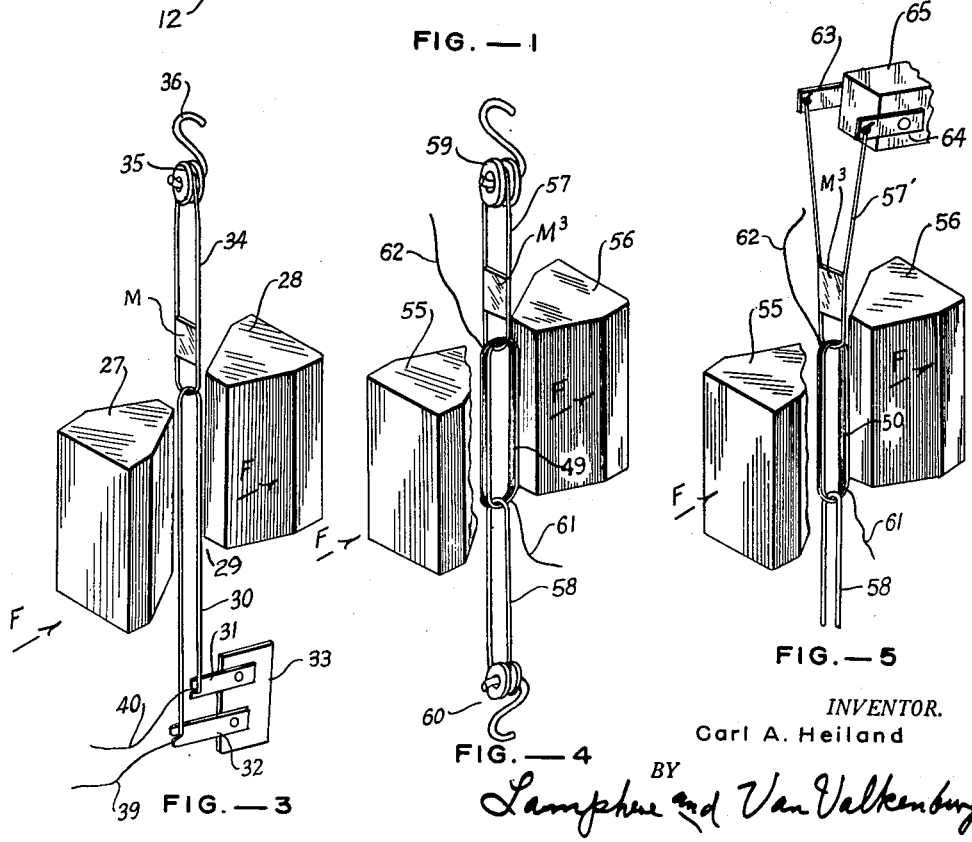
FIG.—3
FIG.—4
FIG.—5
INVENTOR.
Carl A. Heiland
BY Lamphere and Van Valkenburgh
ATTORNEYS April 27, 1954     C. A. HEILAND     2,677,105
BIFILAR SUSPENSION
Filed May 15, 1950                                     2 Sheets—Sheet 2
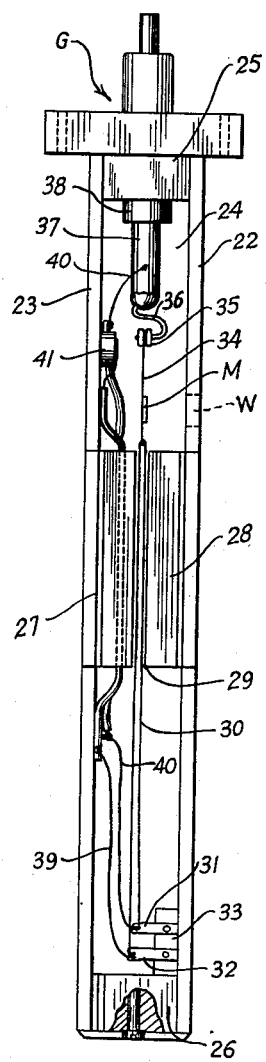
FIG.—2
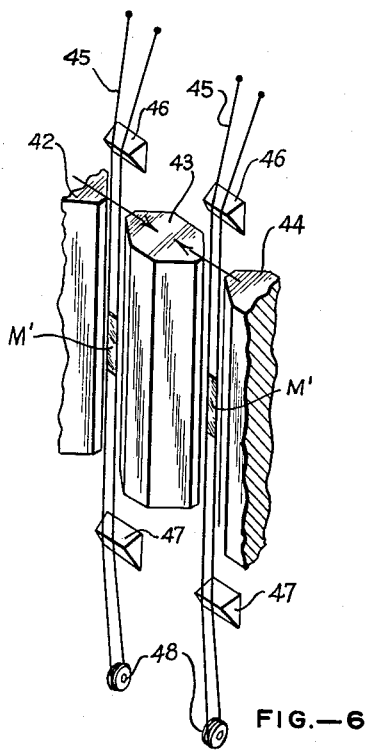
FIG.—6
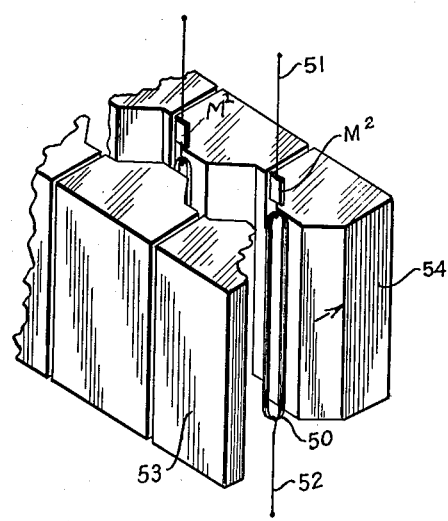
FIG.—7
INVENTOR.
Carl A. Heiland
BY Lamphere and Van Valkenburgh
ATTORNEYS Patented Apr. 27, 1954

2,677,105

UNITED STATES PATENT OFFICE 2,677,105

BIFILAR SUSPENSION

Carl A. Heiland, Denver, Colo., assignor to Heiland Research Corporation, Denver, Colo., a corporation of Colorado Application May 15, 1950, Serial No. 162,089

8 Claims. (Cl. 324—154)

1

This invention relates to galvanometers and more particularly to the suspension of the vibrating element in the magnetic field thereof.

One of the objects of the invention is to produce an improved bifilar suspension arrangement for a galvanometer which will permit the mirror to be mounted outside of the magnetic field with its reflecting surface at right angles to the direction of the field, thereby allowing for the magnet pole structure to be arranged in a narrow space considered in the direction at right angles to the incident beam.

Another object is to produce a galvanometer suspension in which a looped current carrying member is positioned in a magnetic field with its plane parallel thereto and a second looped member is positioned outside the field in a plane at right angles to the field whereby it becomes possible to mount to both legs thereof a mirror with its reflecting surface at right angles to the field.

Still another object is to produce a new U-loop suspension arrangement for a galvanometer which will permit easy mounting of a mirror so that its reflecting surface is at right angles to the field in which is suspended a looped current carrying member with its plane parallel with the field.

A further and more specific object is to produce an improved bifilar suspension which will permit easy mounting of a mirror outside the field with its reflecting surface at right angles to the field.

A still further object is to produce an improved suspension for a galvanometer current carrying coil of several turns which will permit the reflecting mirror to be mounted in a stable and easy manner on an inactive part of the suspension and with its reflecting surface at right angles to the plane of the coil.

Yet a further object is to produce an improved suspension for a galvanometer which will permit a mirror to be mounted on and between two legs of an inactive looped suspension member, and with its reflecting surface at right angles to the plane of the field and the plane of the current carrying looped member suspended therein.

Other objects are to produce a galvanometer suspension which will result in space saving, will be economical to produce, and will insure better mounting of the reflecting mirror.

Still other objects will become apparent from the following description taken in connection with the accompanying drawings in which:

Figure 1 is a side view of an oscillograph structure having a galvanometer in which is embodied my improved suspension;

2

Figure 2 is a side view of the galvanometer assembly showing it removed from the mounting casing;

Figure 3 is a schematic view of a suspension embodying my invention and disclosing details thereof;

Figures 4 and 5 are other schematic views of modified suspensions in which current carrying coils of several turns are employed; and Figures 6 and 7 are schematic views of conventional suspensions giving pictorial illustrations in order that comparisons may be easily made with my improved suspensions and the manner in which space saving and better mirror mounting are accomplished.

Referring to the drawings in detail and first to Figures 1 and 2, there is disclosed in Figure 1 an oscillograph structure embodying a galvanometer wherein the magnetic legs 10 and 11 forming cores of electrical coils 12 and 13 are magnetized. On top of the legs are mounted magnetic members 14 and 15 extending toward each other and having cylindrical inner end surfaces in spaced relation to receive and adjustably support a casing structure C for a galvanometer. The magnetic member 14 is arranged to be adjustable in the manner shown so as to permit adjustment of the casing C about an axis. The casing C has two semi-cylindrical magnets 16 and 17 carried on opposite sides thereof and arranged for cooperation with the cylindrical inner end surfaces of the magnetic members 14 and 15. The casing C also has a window 18 with lens whereby an incident light beam 19 can enter the casing and be reflected by a mirror (to be later referred to) on a galvanometer to produce a reflected beam 20.

The galvanometer structure, as shown in Figure 1, is indicated by the letter G and is removable as a unit from the casing C after first removing holding screws 21. This galvanometer unit is shown in detail in Figure 2 and includes my improved suspension means. As shown, the galvanometer structure has a front wall 22, a rear wall 23 and a single side wall 24 which is at the opposite side of that directly viewed in Figure 2. There is also a top wall 25 and a bottom wall 26.

The front and rear walls have secured thereto pole pieces 27 and 28 in spaced relation to provide an air gap 29 subject to a magnetic field in which will be mounted the current carrying active loops of suspension, commonly known as the vibratory element. The suspension shown in the galvanometer structure of Figure 2, and further schematically illustrated in Figure 3, is a so-called bifilar arrangement. The active loop is a single U-shaped wire 30 which is positioned to have its parallel legs in the magnetic field. The lower free ends of this loop are attached to holding clamps 31 and 32 carried by an insulating block 33 on the front wall of the galvanometer structure. Looped through the upper end of the active loop 30 of the bifilar suspension is a second inactive U-shaped loop 34. The upper ends of this loop 34 are attached to a grommet 35 mounted on an S-shaped member 36 which is attached by insulation material to a suspension head 37 carried in the top wall 25, said head being suitably insulated from the top wall by insulating material 38. The head can be adjustable to vary the tension of both the active and inactive loops of the suspension. The two loops of the suspension will lie in planes at right angles to each other with the plane of the active loop lying in and parallel with the direction of the magnetic field established between the two pole pieces 27 and 28. The two looped wires may, if desired, be rigidly connected together by a metallic connection at the point of overlap engagement.

The inactive looped wire 34 has mounted thereon the mirror M which will be opposite a window W in the front wall 22, and when the galvanometer structure G is in the casing C the window W will align with window 18 in said casing. Current is connected to the active loop member 30 through wires 39 and 40, the wire 39 being connected to a plug 41 in the rear wall of the galvanometer structure and the wire 40 being connected to a part of the suspension head insulated from the grommet 35. The plug and suspension head can then be suitably connected to the source of variable current which is to be recorded by means of the galvanometer.

To obtain a better understanding of the results to be obtained from my improved suspension and galvanometer structure just described, reference is had to Figure 3, which is a schematic view. It will be seen that the active loop 30 will have its plane parallel with the direction of the field between the pole pieces 27 and 28, which direction is indicated by the arrows F. It will further be noted that the mirror M is fastened in between the two legs of the inactive loop 34 and at opposite edges. The mounting of the mirror on the inactive loop 34 will be easily accomplished, since it is merely necessary to connect the two side edges to the two legs. This will make a more stable mounting for the mirror.

However, among the most important features of the improved suspension is that by the use of the inactive loop 34 in the suspension and the mounting of the mirror thereon, the mirror will be placed at right angles to the direction of the field. This could not be done in conventional bifilar suspensions, as can be readily ascertained by consideration of Figure 6. Here is disclosed a series of pole pieces 42, 43 and 44, arranged in transverse relation to provide a series of aligned fields. A bifilar suspension comprising the single looped member 45 will be positioned in each field and these suspensions must be such that the plane of the looped members will be in the direction of the field. To accomplish this, the loop member cooperates with bridge pieces 46 and 47 above and below the pole pieces and the looped end of the suspension is attached to a grommet 48. The mirror M' will be attached to the two legs of the suspension and it will be particularly noted that this mirror is in the same plane as the plane of the looped wire forming the suspension. Because of this position of the mirror, the transverse relation of the pole pieces becomes necessary. With this type of so-called conventional bifilar suspension, it will be readily seen that when a bank of galvanometers is desired, the width of the bank will be considerably wider than a bank of galvanometers having the same number of channels and employing my improved suspension, as is shown in Figures 2 and 3. Each galvanometer, with my improved suspension, will have a width equal to the width of the pole pieces. With the conventional suspension, each galvanometer will have a width equal to the length of the two pole pieces plus the gap between the pole pieces. It will not be possible in the conventional bifilar suspension to have the mirror mounted in a plane which is at right angles to the direction of the field, so that the pole pieces could be placed in sets side by side, as will be done with my improved suspension. If such were attempted by mounting the mirror between the two legs of the loop, then the wire of one leg would cast a shadow on the mirror and thus be very unsatisfactory.

In Figure 4 there is disclosed a schematic view of another suspension embodying my invention and having a coil 49 with several turns, as the active element. A conventional suspension of such a coil is shown schematically in Figure 7, wherein the coil 50 is suspended between two ribbons or wires 51 and 52. The ends of the ribbons will be connected to the current to be recorded or measured. The coil is suspended between the pole pieces 53 and 54 and the mirror $M^2$ is mounted on the ribbon 51. In this conventional mounting, the sets of pole pieces can be placed in side by side relation and thus the overall transverse space required for a selected number of channels in a multi-channel instrument will be approximately the same as when units embodying my improved bifilar type of suspension are employed. However, with this conventional coil type of suspension, the mirror must be mounted on a single ribbon which is an active current carrying element of the suspension. Much difficulty is present in making the mirror mounting, particularly in having it mounted so that its reflecting surface is at right angles to the coil which must have its plane parallel to the direction of the magnetic field.

In accordance with my invention as embodied in the structure of Figure 4, the coil 49 having the several turns is suspended in the magnetic field established by the pole pieces by two looped members 57 and 58. The upper member 57 is looped through the upper end of the coil and attached to the grommet 59 mounted on the suspension head in a suitable manner. The lower member 58 is looped through the lower end of the coil and attached to a grommet 60 which will be suitably mounted at the bottom of the galvanometer structure. The coil will have its plane parallel with the field direction indicated by the arrows F, and the plane of the upper and lower looped suspension members 57 and 58 will be at right angles to the plane of the coil. To the upper looped member will be mounted the mirror $M^3$ between the legs of the looped member and with opposed edges secured to the legs. Thus, the mirror reflecting surface will be at right angles to the plane of the coil and the field direction. The desired space saving arrangement of the pole pieces will thus be present. The mirror will be mounted on an inactive suspension member, and this member is such that easy mirror mounting can be made with assurance that its surface will be at right angles to the coil plane. The coil can be connected by wires 61 and 62 to the source of current in any suitable manner, independent of the suspension, as these wires will not affect the restoring torque of the looped or bifilar part of the suspension. Where the looped suspension members and the coil overlap, metallic connection can be made if desired.

If it should be desired to increase the restoring torque of the suspension for a coil, this can be accomplished in a manner shown in Figure 5. The upper looped suspending member 57' will have its upper ends attached to holding clamps 63 and 64 carried by a mounting block 65 of insulating material. The holding clamps will be spaced apart such a distance that the legs of the looped member 57' above the mirror M³ will have diverging relation. Thus, when the coil 59 is deflected, greater forces will be effective to restore it to the parallel position. If desired, the legs of the lower looped suspending member 58 can be made divergent when still greater restoring torque is desired.

From the foregoing description of different types of suspensions embodying my invention, it is believed to be apparent that many new results have been achieved thereby. When a bifilar active or current carrying element is employed, it is possible to obtain a very desirable saving in space, which is important when multiple channels are desired. Furthermore, easier mounting of the mirror is accomplished, together with greater accuracy in the relationship between the reflecting surface of the mirror and the plane of the active element. The same advantages in mirror mounting will be present when my improved suspension is employed with a coil of several turns. Further, in the coil type of mounting it is possible to increase the restoring torque of the coil in an easy manner and thus attain a natural high frequency with such a suspended coil, all being impossible with conventional coil type suspension.

In the specification and claims the term "looped member" is employed in a generic manner to refer to either a member which is continuous and closed, as the members 34 and 57, the coil 49, or to the U-shaped members such as 30 or 57.

Being aware of the possibility of modifications in the structures disclosed as embodying my invention, all without departing from the fundamental principles of the invention, I desire it to be understood that the scope thereof is not to be limited in any manner except in accordance with terms of the appended claims or equivalents.

What is claimed is:

1. In a galvanometer, a supporting structure comprising a stationary part of the galvanometer, means comprising spaced pole pieces for establishing a magnetic field across the space, a looped member positioned in the field with the plane of said member being parallel with the direction of the field, a second looped member made from a continuous integral element and having a portion which is turned on itself and looped through the first looped member at the turning and positioned to be in a plane at right angles to the plane of the said first looped member, means on opposite sides of the field for supporting the two looped members on the supporting structure with the first positioned in the field, said second looped member having legs in continuously spaced relation from the first looped member to its supporting means with each leg being attached to the supporting structure, a mirror attached to both spaced legs of the second looped member with its reflecting surface also at right angles to the first looper member, and means for connecting the first looped member to a source of current so as to be movable in response to current flow therein.

2. The galvanometer of claim 1 in which the second looped member is U-shaped and its legs extend in diverging relation from the first looped member.

3. The galvanometer of claim 1 in which the first looped member is a coil of several turns and the second looped member is U-shaped.

4. The galvanometer of claim 3 in which there is a third looped member looped through the coil at its end opposite the second looped member and constituting part of the means for supporting the coil and second looped member.

5. The galvanometer of claim 1 in which the second looped member is made of a continuous single element having parallel side legs.

6. In a galvanometer, means comprising spaced pole pieces for establishing a magnetic field across the space, a U-shaped current carrying member positioned in the field for movement in response to current flowing therethrough, and a second U-shaped member made of a continuous integral element having its turned end looped through the loop end of the first U-shaped member and its legs of like lengths and in continuous spaced relation throughout their lengths, means for mounting the ends of the U-shaped members on opposite sides of the field so that the first current carrying U-shaped member is in a plane parallel to the direction of the field and the second U-shaped member is in a plane at right angles thereto, and a mirror carried by the legs of the second U-shaped member with its reflecting surface also at right angles to the plane of the first U-shaped member.

7. In a galvanometer, means comprising spaced pole pieces for establishing a magnetic field across the space, a U-shaped current carrying member positioned in the field for movement in response to current flowing therethrough, and a second U-shaped member made of a single continuous element having its turned end looped through the loop end of the first U-shaped member and its legs of like lengths and in continuous spaced relation throughout their lengths, means for mounting the ends of the U-shaped members on opposite sides of the field so that the first current carrying U-shaped member is in a plane parallel to the direction of the field and the second U-shaped member is in a plane at right angles thereto, and a mirror positioned between and having opposed marginal portions attached to the legs of the second U-shaped member so that its reflecting surface will also be at right angles to the plane of the first U-shaped member.

8. In a bifilar suspension for a galvanometer having means comprising spaced pole pieces for establishing a magnetic field across the space, a U-shaped looped member positioned in the field with the plane of the spaced legs of said member being parallel with the direction of the field, a second member made from a continuous integral element and having a looped portion and leg portions, means for connecting the looped portion of the second member to a looped end of the first looped member so that the plane containing the leg portions of the second member will be at right angles to the plane of the first looped member and the direction of the field in which it is positioned, means on opposite sides of the field to which the two members are connected to thereby support the suspension, said legs of the second member being in spaced relation throughout their length from the looped portion to the support means, a mirror positioned between and attached to both legs of the second member with its reflecting surface also at right angles to the first looped member, and means for connecting the first looped member to a source of current so it will be movable in response to current flow therein.

References Cited in the file of this patent

UNITED STATES PATENTS

| Number | Name | Date |
|---|---|---|
| 2,519,591 | Morrow | Aug. 22, 1950 |
| 2,550,720 | Richardson | May 1, 1951 |